United States Patent [19]
Crabb

[11] 3,983,977
[45] Oct. 5, 1976

[54] ELECTRIC EXTENSION CORD REEL

[76] Inventor: Virgil R. Crabb, 430 E. 9th St., Port Angeles, Wash. 98362

[22] Filed: Nov. 19, 1975

[21] Appl. No.: 633,264

[52] U.S. Cl. .............................. 191/12.4; 242/96
[51] Int. Cl.² .................................. H02G 11/02
[58] Field of Search .................... 191/12.2 R, 12.4; 242/96, 99; 339/2 RL, 5 RL, 6 RL, 8 RL; 114/235 WS; 254/186 HC

[56] References Cited
UNITED STATES PATENTS

| | | | |
|---|---|---|---|
| 1,512,188 | 10/1924 | Anderson | 242/96 |
| 1,623,823 | 4/1927 | Bittick | 191/12.4 |
| 1,944,669 | 1/1934 | Purdy | 242/96 |
| 2,805,290 | 9/1957 | Wentsel | 191/12.4 |
| 2,896,878 | 7/1959 | Wetzel | 242/99 |
| 3,481,557 | 12/1969 | Miller | 242/96 |
| 3,942,736 | 3/1976 | Ramas | 246/96 |

Primary Examiner—Trygve M. Blix
Assistant Examiner—Reinhard J. Eisenzopf
Attorney, Agent, or Firm—William I. Beach

[57] ABSTRACT

A reel for transporting a coiled electric cord a substantial distance from an electrical source of power to activate an electric appliance. The reel comprises a spool-like body having interior cone-shaped journals rotatably supported on matching cone-shaped bearings mounted on an axle. An elongate handle is rotatably mounted at one end of the spool for holding the reel and a shorter handle affixed to the other end of the spool to rotate the same about the longitudinal axis of the axle. The transfer of electricity to an appliance is provided by means of an electrical receptacle secured to the spool. The reel incorporates adjustable means for regulating the rotation of the spool to compensate for varying tensile loads on the cord.

7 Claims, 4 Drawing Figures

U.S. Patent   Oct. 5, 1976   3,983,977
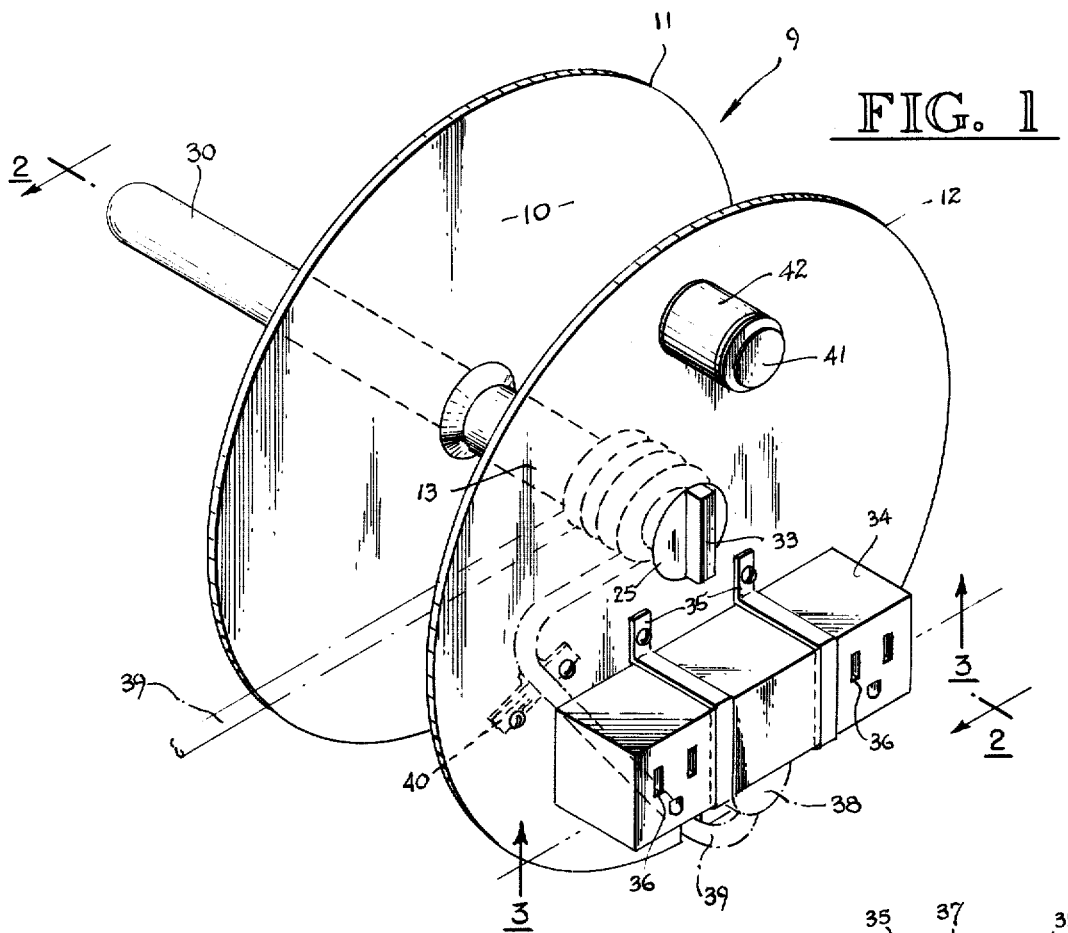
FIG. 1
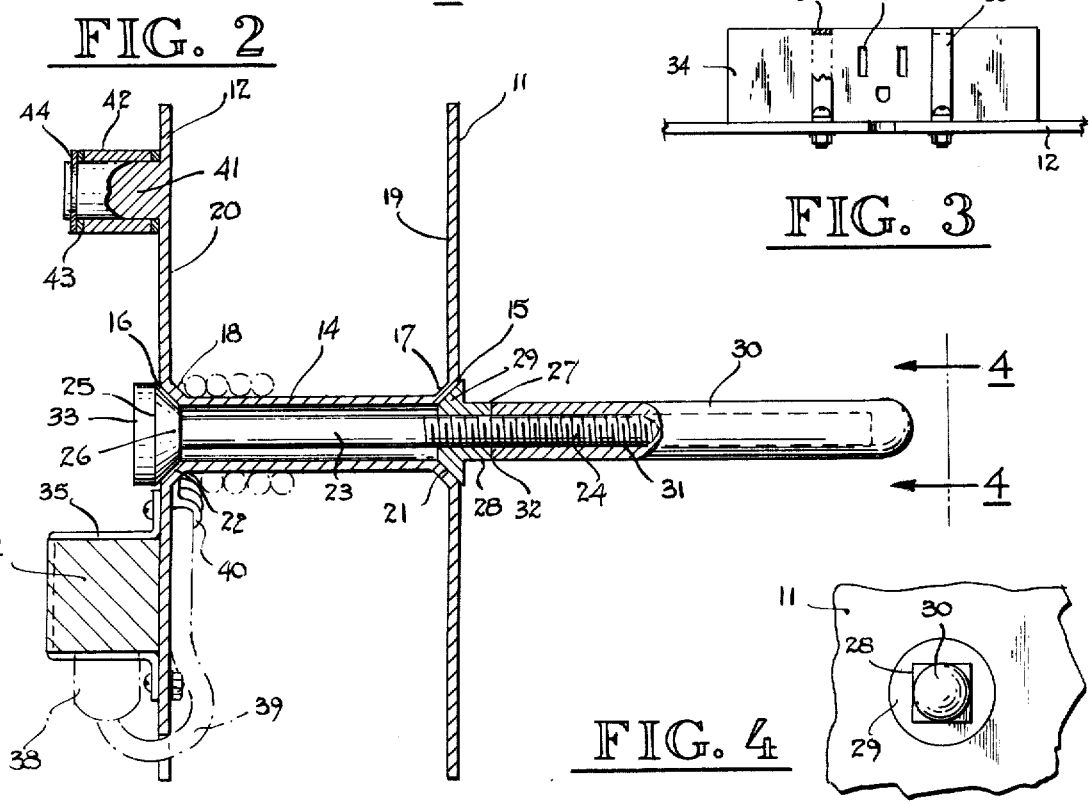
FIG. 2
FIG. 3
FIG. 4

ELECTRIC EXTENSION CORD REEL

BACKGROUND OF THE INVENTION

1. Field of the Invention

The present invention relates to reels in general and more particularly to reels for transporting a lengthy coiled electric cord an appreciable distance from a source of electrical energy to operate an appliance.

2. Description of the Prior Art

Frequently in construction or repair work it is necessary to use an electric tool such as a portable drill motor, saw, sander or the like some distance from a source of electric power. The most convenient and efficient means of transmitting temporary electrical energy to a point of work is by way of an extended electric cord coiled on a reel. A standard reel consists of a spool-like body having a pair of hubs which rotate on axle bearings or of similar arrangement. A handle for holding the reel is secured to one end of the spool and a shorter handle to the other end for rotating the spool about the axle bearing, usually metal to metal contact, so as to wind or rewind the extension cord thereon. Fixed positioned metal hubs and bearings tend to wear or erode each others surface and eventually provide a loose or "sloppy" rotational fit. Since such reels have no means for taking up the play between fixed positioned bearings and hubs as described, a "free wheeling" condition of the spool is created. For example, when carrying the reel from point to point at ground level a spool rotating on worn-out bearings allows the extension cord to sag heavily to the ground. While such a condition may not promote difficult problems when an electric tool is used at ground level it becomes a serious problem when transported to a higher level. A worker having to use an electric tool on a ladder, scaffold or at some height from the ground level from which an extension cord is relaying electric power, will at some time experience a rapid uncoiling of the extension cord from off of the spool due to the weight of the unwinding cord. As the reel is lifted higher the increasing length of uncoiling cord applies a greater turning moment on the spool causing it to start spinning and unless stopped by some means the cord will completely unwind and fall to the ground. Subsequently, the uncoiled cord lays in a loosely piled, tangled heap. To rewind the cord thereafter it frequently requires considerable time and effort to untangle and straighten out knots in the cord to get it coiled properly again on the spool.

Although several attempts have been made to provide a device designed to improve the utility and service of extension cord reels none, as far as it is known, has succeeded in overcoming the aforementioned problems. In that connection, reference is made to a device shown in U.S. Pat. No. 2,805,290 issued to R. J. Wentsel which provides a reel having an electrical outlet receptacle disposed inside a hub on the inner face of a circular end plate rigidly connected to one end of the hub. The lead wires of an extension cord are connected to the terminals of the receptacle and the balance of the cord is then threaded through a hole in the hub and coiled thereabout. The opposite circular plate, also rigidly connected to the other end of the hub, is rotatably supported in a cantilever manner from the pivotal bolted end of an elongate handle. The structural design of the Wentsel reel does not adapt to lengthy or heavyweight extension cords. For example, a lightweight, 100 foot extension cord weighs approximately 4¼ pounds and a heavy-duty No. 3 wire cord weighs considerably more. This much weight coiled on the hub of Wentsel's reel would obviously impose a severe bending moment on the pivotal end of the elongate handle which could cause the circular end plate attached thereto to flex or become deformed. In flexing, the end plate would tend to bind the pivotal connection and under such a condition it is doubtful that the reel would function for the length or weight of the type of extension cord cited above. It is seen also that other problems could develop should it be necessary to replace the extension cord in the hub of Wentsel's reel. Referring to FIG. 4 and FIG. 5 of his patent drawing, the cord is led through a small hole in the hub and the wire leads are connected to the electrical outlet terminals. In FIG. 5 the cord is tied in a knot inside the hub to prevent tensile stress on the cord from pulling the leads loose from the terminals. In this case the cord insulation cover may wear out in the vicinity of the hole and expose the wire to shorting situations. The possibility of pulling the lead wires loose from the terminals is even greater in accordance with the arrangement shown in FIG. 4. Be that as it may, the structural design having the end plates rigidly connected to the hub does not permit simple and rapid access to the electrical outlet receptacle should it be necessary to replace or disconnect the extension cord. Sometimes it is desirable to change extension cords according to length or weight or both. Aside from the structural difficulties which obviously limit efficient and economical use of the Wentsel device, there is no means or mechanical adjustment features provided to regulate the rotatable effect of tension forces exerted by the extension cord on the reel.

Another U.S. Pat. No. 1,944,669 issued to E. G. Purdy provides a cylindrical hub rigidly secured to a pair of circular end plates in a manner similar to the Wentsel design. The hub end plates have central portions punched out and flanged inwardly to form bearing sleeves. An elongate handle for supporting the reel has a shaft extending through the sleeves to rotatably support the hub thereon. The shaft is secured in position by a pin inside the hub adjacent to the sleeve nearest the end of the handle. Again it can be seen in FIG. 2 of Purdy's drawing that the relationship of the metal bearing of his shaft in metal sleeves will eventually induce wear in the rotational surfaces. Likewise there is no means provided to correct for rotational wear and further, no adjustment for tensile loads exerted on the reel by the extension cord. Since the Purdy device is designed for use with a clothesline, it does not incorporate electric connection thereon.

Yet another U.S. Pat. No. 1,512,188 issued to P. L. Anderson shows a device constructed very similarly to the Purdy device with the exception that it provides a ratchet-pawl mechanism cooperatively connected to the reel. The reel provides a bracket which can be bolted to a post, for example, and a line such as a clothesline stretched to a fixed connection. Then the line is secured in a tightened position by rotating the reel until the ratchet is engaged with one tooth on a pawl. It is to be pointed out here that the ratchet-pawl arrangement merely serves to tighten the line to a complete stop in only one direction. There is no adjustment provided to regulate the turning moment on the reel when transporting a coiled extension cord from one point to another point on ground level or to a higher position.

Therefore, it is the object of the present invention to provide an electric extension cord reel that has the structural and mechanical means to solve the aforementioned problems, yet which can be readily manufactured and assembled expeditiously.

SUMMARY OF THE INVENTION

In carrying out the present invention in accordance with a preferred embodiment thereof, an electric extension cord reel has a spool-like body with a first and second annular plate spaced apart by an elongate cylinder. The cylinder has a bore extending through central openings in the inner and outer faces of the plates. The end wall portions of the cylinder are flared conically outwardly adjacent to the inner faces to merge integrally with the peripheral wall in the openings to form a pair of opposed cone-shaped journals which provide a longitudinal axis of rotation therethrough. The second plate has a handle-like projection located on its outer face adjacent to the peripheral edge and is adapted to rotate the spool about its longitudinal axis of rotation. There is an axle disposed partly within the bore of the cylinder arranged to rotatably and cooperatively support the spool in the journal of the second plate. An adjustable bearing member is also mounted on the axle and arranged to rotatably and cooperatively support the spool in the journal of the first plate. Further, an elongate handle is co-axially mounted on the axle outwardly of the adjustable bearing member and adapted to be coupled therewith. Secured to the outer face of the second plate is an electrical outlet receptacle which has a set of recesses to receive the prongs of an electric plug connected to an appliance. Wound on the cylinder is an elongate electric extension cord which has an inner end plugged into another set of recesses located in the outlet receptacle and the outer end available for plugging into a wall socket. Importantly, the present invention comprises adjustable means for regulating the rotation of the spool about its longitudinal axis of rotation.

BRIEF DESCRIPTION OF THE DRAWING

FIG. 1 is a general perspective view of the present invention disclosed herein.

FIG. 2 is a partial cross-sectional view taken along line 2—2 of FIG. 1.

FIG. 3 is a bottom view of the electrical outlet receptacle taken along line 3—3 of FIG. 1.

FIG. 4 is an end view of the elongate handle taken along line 4—4 of FIG. 2.

DETAILED DESCRIPTION

Referring to FIGS. 1 and 2 it can be seen that the present invention consists of a portable reel 9 having a spool-like body 10. The spool has a first and second annular plate 11 and 12 spaced apart and integrally connected by cylinder 13. The cylinder has a bore 14 extending through openings 15 and 16 in plates 11 and 12. The juncture of cylinder 13 to plates 11 and 12 has end portions 17 and 18 flared outwardly adjacent to inner faces 19 and 20 to form cone-shaped journals 21 and 22.

An axle 23 disposed in the bore 14 has a threaded end portion 24 protruding outward of opening 15 in plate 11. The opposite distal end 25 of axle 23 is expanded outwardly into a cone-shaped bearing 26 which is adapted to slidably and rotatably engage bearing 26 in surface contact with journal 22 in plate 12.

In combination with axle 23 is an adjustable bearing member 27 which has square rear end portion 28 suitable for turning in the jaws of a wrench or pair of pliers and a front end portion expanded into an inverted cone-shaped bearing 29. The adjustable bearing member 27 also has a threaded bore adapted to be rotatably mounted on threaded end portion 24 and advanced toward opening 15 to slidably and rotatably engage bearing 29 in surface contact with journal 21 in plate 11.

Also, in combination with axle 23 and bearing member 27 is an elongate handle 30 which has a threaded bore 31 adapted to be rotatably mounted on end portion 24. The handle 30 is likewise advanced along end portion 24 to abut open end 32 against the square end portion 28. When the bearing member 27 is properly adjusted, as will be described later in more detail, so that bearings 26 and 29 are in selected rotational contact with journals 22 and 21 respectively the elongate handle is jammed against bearing member 27 so as to prevent the axle 23 from turning and the bearings from becoming loose or to tighten in the journals due to rotational loads exerted on cylinder 13.

On the distal end of axle 23 is a rectangular projection 33 extending outward of plate 12 which is arranged to be gripped by the fingers so as to hold axle 23 stationary while bearing member 27 is properly adjusted in relation to journals 21 and 22. In that connection, the freedom of rotation of spool 10 can be readily regulated by gripping projection 33 with one hand and by turning bearing member 27 on axle 23 clockwise or counterclockwise depending upon the need to bring bearings 26 and 29 in surface closing or opening contact with journals 22 and 21 respectively. For example, when bearing member 27 is rotated in a clockwise direction on axle 23 the axial distance between bearings 26 and 29 is decreased in relation to the fixed distance between journals 22 and 21 whereupon the rotational space between the corresponding surfaces is brought in closing contact. Further, if continued in the same direction the surfaces would jam tightly together and prevent any rotation of spool 10. Likewise, rotating bearing member 27 in a counterclockwise direction would reverse the process until spool 10 became loose and rotate freely. Accordingly, with particular reference to the above, it is seen that the present invention provides unique means to regulate and control the rotational forces on spool 10.

Referring again to FIG. 2, an electrical outlet receptacle 34 is shown radially spaced from projection 33 and secured to plate 12 by a pair of brackets 35. The receptacle 34 has recesses 36 in one side to receive the prongs of a plug attached to an electric appliance. For convenience and efficiency of operation it is preferable to have enough recesses to accommodate several pieces of electric appliances although receptacle 34 need have only one set of recesses to suffice for most applications. It is to be pointed out that due to current electrical codes recesses 36 has a third opening for a ground wire. In addition, another set of recesses 37 as seen in FIG. 3, is located on the bottom side of receptacle 34 in order to be supplied by a source of electrical energy.

The plug 38 inserted in recesses 37 is connected to the inner end of an elongate electric extension cord 39. Cord 39 may comprise 100 feet of lightweight wire or a heavier No. 3 wire and is coiled around cylinder 13 between plates 11 and 12. The plug connected to the outer end of cord 39, not shown here, is available to be plugged into a wall socket to energize receptacle 34 through inserted plug 38. The section of cord 39 adjacent to receptacle 34 is clamped to the inner face of plate 12 by insulated bracket 40 to prevent an inadvertent separation of plug 38 and receptacle 34 due to an exceptional pull or tension exerted on cord 39 when completely unwound from off of cylinder 13. Bracket 40 is adapted to hold several sizes of cord and is easily removed and replaced when a change of extension cord is made.

A handle-like knob 41 is eccentrically and integrally formed on the outer face of plate 12 adjacent to the peripheral edge thereof. Knob 41 is arranged to rotate spool 10 about the longitudinal axis of axle 23 co-axially connected to elongate handle 30. A collar 42, washers 43 and snap ring 44 are rotatably mounted on knob 41 to complete the handle assembly.

In operating the present invention the inner end plug 38 of extension cord 39 is inserted in recesses 37 of receptacle 34 and an adjacent portion of the cord clamped to plate 12 with bracket 40. Then the cord adjacent to bracket 40 is placed on cylinder 13 whereupon holding the reel 9 by the elongate handle 30 in one hand the knob-like handle 41 is gripped by the other hand and turned in a direction to rotate spool 10 about axle 23 and handle 30 so as to wind the full length of cord 39 about cylinder 13. Then when required to operate an electric appliance some distance from a source of electrical power cord 39 is connected to a wall socket or the like and reel 9 hand carried by handle 30 allowing cord 39 to unwind from spool 10 along the way. Upon reaching the job the appliance is plugged into receptacle 34 thereby becoming electrically operable.

As previously described, the freedom of rotation or amount of drag applied on spool 10 to compensate for the tensile load exerted by cord 39 can be readily regulated by closing or opening the rotatable surface space between bearings 26 and 29 and journals 22 and 21. When working at ground level it is normal to adjust said spacing so that spool 10 spins rather freely as cord 39 is pulled along the ground. On the other hand when climbing a ladder to work at a higher level it is desirable to apply enough drag on the spool so that reel 9 has to be pulled slightly against the tensile load in cord 39 in order to uncoil the cord from cylinder 13. Accordingly, by means of presetting the drag on spool 10, the exact length of cord can be uncoiled to reach the point of work and to assure that no more will unwind from spool 10 the projection 33 on distal end 25 of axle 23 can be held with one hand while turning the bearing member 27 clockwise with the other hand so as to jam tightly the rotating surfaces of journals 21 and 22 on bearings 29 and 26 respectively.

From the description and illustration of the present invention it is obvious that it provides important advantages to enhance its effective and efficient use as an extension cord reel.

The foregoing description is to be clearly understood to be given by way of illustration and example only, the spirit and scope of the present invention being limited solely by the appended claims.

I claim as my invention:

1. An electric extension cord reel which comprises:
   a spool-like body defined by a first and second annular plate spaced apart by an elongate cylinder having a bore extending through central openings in an inner and outer face of the plates, the end wall portions of the cylinder being flared conically outwardly adjacent to the inner faces to merge integrally with the peripheral wall in the openings and form a pair of opposed cone-shaped journals providing a longitudinal axis of rotation therethrough and said second plate having further a handle-like projection disposed on the outer face adjacent to the peripheral edge thereof and adapted to rotate the spool about its longitudinal axis of rotation,
   an axle disposed partly within the bore of said cylinder arranged to rotatably and cooperatively support said spool in the journal of said second plate,
   an adjustable bearing member mounted on the axle adapted to rotatably and cooperatively support said spool in the journal of said first plate,
   an elongate handle co-axially mounted on said axle outwardly of the adjustable bearing member and adapted to be coupled in registry therewith,
   an electrical outlet receptacle secured to said outer face of said second plate having a set of recesses therein to receive the prongs of an electric plug connected to an appliance,
   an elongate electric extension cord wound on said cylinder having an inner end plugged into another set of recesses disposed in the outlet receptacle and the outer end adapted to be plugged into a wall socket, and
   adjustable means for regulating the rotation of said spool about said longitudinal axis of rotation.

2. The reel as recited in claim 1, wherein said axle comprises:
   an elongate shaft having a threaded end portion extending outward of said opening in said first plate and the other distal end being flared outwardly into a cone-shaped bearing surface adapted for slidable and rotatable engagement with said second plate journal, the distal end providing further a finger holding projection extending outward of said outer face of said second plate.

3. The reel as recited in claim 2, wherein the adjustable bearing member comprises:
   a nut-like body having a threaded bore, a square end portion for engagement with the jaws of a wrench and the other end portion expanded abruptly from a plane surface normal to the bore and extending outwardly into an inverted cone-shaped bearing surface, the body being adapted to be threadedly mounted on the threaded end portion of the shaft so as to bring the cone-shaped bearing surface in slidable and rotatable engagement with said first plate journal.

4. The reel as recited in claim 3, wherein the elongate electric cord comprises:
   a bracket secured to said inner face of said second plate arranged to hold an end portion of said cord adjacent to said outlet receptacle to prevent inadvertent uncoupling of said inner end plug from said receptacle when unwinding the full length of said cord from said cylinder.

5. The reel as recited in claim 4, wherein the adjustable means for regulating the rotation of said spool comprises:
   axial reciprocal movement of the nut-like body relative to said axle adapted to slidably and rotatably engage or disengage said bearing surfaces with said journals when adjusting the rotational moment on said spool applied by varying tension loads on said cord.

6. The reel as recited in claim 5, wherein the elongate handle comprises:
   a cylindrical tube having an opening at one end and a threaded bore therein, the tube arranged to be rotatably mounted on said axle and the end brought in abutting contact with the square end of said nut-like body to form a jam nut therewith.

7. The reel as recited in claim 6, wherein the handle-like projection disposed on the outer face of said second plate comprises:
   a collar rotatably mounted on said projection, and fastening means adapted to secure the collar on said projection.

* * * * *